(12) United States Patent
Wiebe

(10) Patent No.: US 7,329,119 B2
(45) Date of Patent: Feb. 12, 2008

(54) VAPORIZER FOR FUEL SUPPLY TO A CARBURETOR

(76) Inventor: Linton Wiebe, 9996 Highway 97 South, Quesnel, British columbia (CA) V2J 6M7

(*) Notice: Subject to any disclaimer, the term of this patent is extended or adjusted under 35 U.S.C. 154(b) by 14 days.

(21) Appl. No.: 10/801,941

(22) Filed: Mar. 17, 2004

(65) Prior Publication Data
US 2005/0053882 A1    Mar. 10, 2005

Related U.S. Application Data

(60) Provisional application No. 60/455,876, filed on Mar. 20, 2003.

(51) Int. Cl.
F23D 11/44    (2006.01)
(52) U.S. Cl. .......... 431/208; 431/207; 123/553
(58) Field of Classification Search ........ 431/208, 431/207; 123/553, 549, 557
See application file for complete search history.

(56) References Cited

U.S. PATENT DOCUMENTS

| 4,106,455 A | | 8/1978 | Vance, Jr. |
| 4,494,516 A | | 1/1985 | Covey, Jr. |
| 4,498,525 A | | 2/1985 | Smith |
| 4,700,047 A | * | 10/1987 | Crossett et al. ............ 219/205 |
| 2003/0140904 A1 | * | 7/2003 | Newhouse et al. ......... 123/549 |
| 2005/0193993 A1 | * | 9/2005 | Dale ........................ 123/549 |

* cited by examiner

Primary Examiner—Alfred Basichas
(74) Attorney, Agent, or Firm—Adrian D. Battison; Michael R. Williams; Ryan W. Dupuis

(57) ABSTRACT

Fuel for supply to the carburetor of an engine is vaporized in a container having a first and second chamber divided by a transverse heating plate against which the fuel is impacted from a fuel injection nozzle a form vapour therefrom so be discharged under pressure from the vaporization through an outlet duct for supplying the vapour from the first chamber to the engine. The heating plate is heated by a heating liquid heated by a thermostatically controlled electrical heating element within the second chamber. The injector is controlled by a pressure switch in the first chamber.

7 Claims, 1 Drawing Sheet

VAPORIZER FOR FUEL SUPPLY TO A CARBURETOR

This application claims priority under 35 U.S.C. 119 from U.S. Provisional Application Ser. No. 60/455,876 filed Mar. 20, 2003.

This invention relates to a fuel vaporizer for supply of fuel in vapor form to the carburetor of an engine such as that of a vehicle.

BACKGROUND OF THE INVENTION

It is known to provide a device for vaporizing fuel prior to supplying that fuel to the carburetor of a combustion engine.

One example is shown in U.S. Pat. No. 4,106,455 (Vance) which discloses a heat exchange system for extracting heat from the oil of the engine without heat being used to vaporise the gasoline fuel following which the vaporised fuel is supplied to a carburetor of the engine. In this arrangement, the heat exchange comprises a coil through which the fuel is supplied for heating.

U.S. Pat. No. 4,494,516 (Covey) discloses a vaporiser for the fuel which uses heat extracted from exhaust gases or from the engine coolant.

U.S. Pat. No. 4,498,525 (Smith) discloses an oil controlled heat exchanger for heating fuel.

However none of these devices has satisfactorily provided an arrangement which can effectively and safely vaporise fuel prior to supply to the engine.

SUMMARY OF THE INVENTION

It is one object of the present invention therefore to provide an improved apparatus for vaporizing fuel for supply to an engine.

According to one aspect of the invention there is provided an apparatus for vaporizing fuel for supply to an engine comprising:

a container having a first and second chamber;

a fuel injection nozzle for injecting fuel from a fuel injection pump into the first chamber;

a heating plate provided in the container and dividing the first and second chambers such that the heating plate forms a wall of each of the first and second chambers;

the fuel injection nozzle and the heating plate being arranged such that the fuel engages against the heating plate for heating the fuel in the first chamber to form vapour therefrom;

an outlet duct for supplying vapour from the first chamber to the engine;

a heating liquid within the second chamber and engaging the heating plate for supplying heat to the heating plate;

and an electrical heating element within the second chamber for supplying heat to the heating liquid.

Preferably the heating plate is at the bottom of the fist chamber and the top of the second chamber.

Preferably the fuel injection nozzle is arranged in the first chamber so as to direct the fuel onto the heating plate.

Preferably the fuel injection nozzle is in a top wall of the first chamber.

Preferably there is provided a heat sensor in the second chamber for detecting the temperature of the liquid.

Preferably there is provided a vapour pressure sensor in the first chamber for operating the fuel injection pump when the pressure falls below a required minimum.

Preferably there is provided a vapour pressure sensor in the first chamber for shutting down the system when the pressure falls rises an allowed maximum.

BRIEF DESCRIPTION OF THE DRAWINGS

One embodiment of the invention will now be described in conjunction with the accompanying drawings, in which.

DETAILED DESCRIPTION OF PREFERRED EMBODIMENTS

Figure 1:
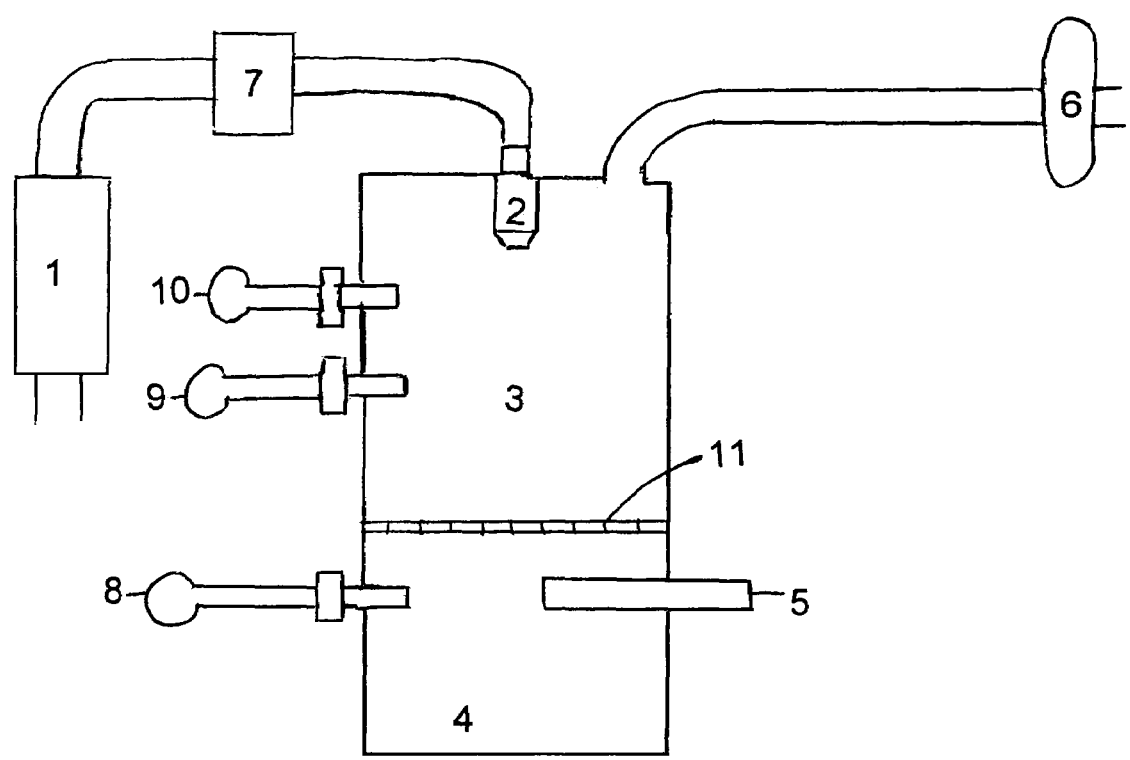
FIG. 1 is a schematic cross sectional view of an apparatus according to the present invention.

The container according to the present invention as shown in the figure comprises a rigid closed container of suitable shape for mounting within the engine compartment of an engine and defining a first upper chamber 3 and a second lower chamber 4 completely separated one from the other by a flat horizontal heating plate 11 bridging across the sides of the container. Within the second chamber 4 is provided an electric heating element 5 which extends into the chamber and is arranged to heat a heat transfer oil located within the second chamber 4. The heating is effected by electrical supply from the 12 volt battery supply to the vehicle. The temperature of the heat transfer oil within the second chamber 4 is controlled a sensor 8 which controls supply of power to the element 5.

Within the first chamber 3 is provided a fuel injector nozzle 2 which is mounted in the top wall of the first chamber so as to direct fuel from the injector nozzle 2 downwardly onto the horizontal bottom heating plate of the first chamber. The fuel thus impacts upon the heating plate which is heated to the required temperature sufficient to vaporise the fuel substantially instantaneously thus forming vapour within the first chamber 3. An outlet in the top wall of the first chamber allows the vapour to escape through a pressure regulator 6 to the vehicle carburetor.

The fuel to the injection nozzle 2 is supplied from a high pressure pump 1 driven by the engine control system through a check valve 7. The pressure within the first chamber 3 is controlled by a low pressure sensor 9 which activates the pump 1 in response to pressure falling below a predetermined required level and a high pressure sensor 10 which shuts off the pump at the high pressure cut-off point.

The arrangement described above provides a totally self contained unit that has its own oil reservoir in the second chamber and oil heating system controlled electrically from the electrical supply of the engine to maintain the heating plate at the required temperature. The vaporiser chamber then produces vapour to be fed to the carburetor.

The device does not use any heat from the engine so that it is safe and cannot overheat. The device is totally self contained so as to pump the fuel in and allow the vapour out.

The device runs on a 12 volt system with no heat taken from the water, exhaust or oil of the engine. The 12 volt system provides activation of the high pressure pump which supplies the fuel and also controls the heating element which heats the oil chamber. The high pressure fuel is sprayed onto the hot surface provided by the heating plate to produce vapour. The device is controlled electronically to maintain heat vapour and to provide maximum safety.

The device can be used for many different applications, for example replacing propane or natural gas on duel fuel vehicles.

Since various modifications can be made in our invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. An apparatus for vaporizing fuel for supply to an engine comprising:
    a container having a first and second chamber;
    a fuel injection nozzle for injecting fuel from a fuel injection pump into the first chamber;
    a heating plate provided in the container and dividing the first and second chambers such that the heating plate forms a wall of each of the first and second chambers;
    the fuel injection nozzle and the heating plate being arranged such that the fuel engages against the heating plate for heating the fuel in the first chamber to form vapour therefrom;
    an outlet duct for supplying vapour from the first chamber to the engine;
    a heating liquid within the second chamber and engaging the heating plate for supplying heat to the heating plate;
    and an electrical heating element within the second chamber for supplying heat to the heating liquid.

2. The apparatus according to claim 1 wherein the heating plate is at the bottom of the first chamber and the top of the second chamber.

3. The apparatus according to claim 1 wherein the fuel injection nozzle is arranged in the first chamber so as to direct the fuel onto the heating plate.

4. The apparatus according to claim 1 wherein the fuel injection nozzle is in a top wall of the first chamber.

5. The apparatus according to claim 1 wherein there is provided a heat sensor in the second chamber for detecting the temperature of the liquid.

6. The apparatus according to claim 1 wherein there is provided a vapour pressure sensor in the first chamber for operating the fuel injection pump when the pressure falls below a required minimum.

7. The apparatus according to claim 1 wherein there is provided a vapour pressure sensor in the first chamber for shutting down the system when the pressure falls rises an allowed maximum.

* * * * *